May 18, 1965 W. H. BUSSEY 3,184,708
ELECTRICAL GUIDANCE SYSTEM FOR SHIPS
Filed May 3, 1960
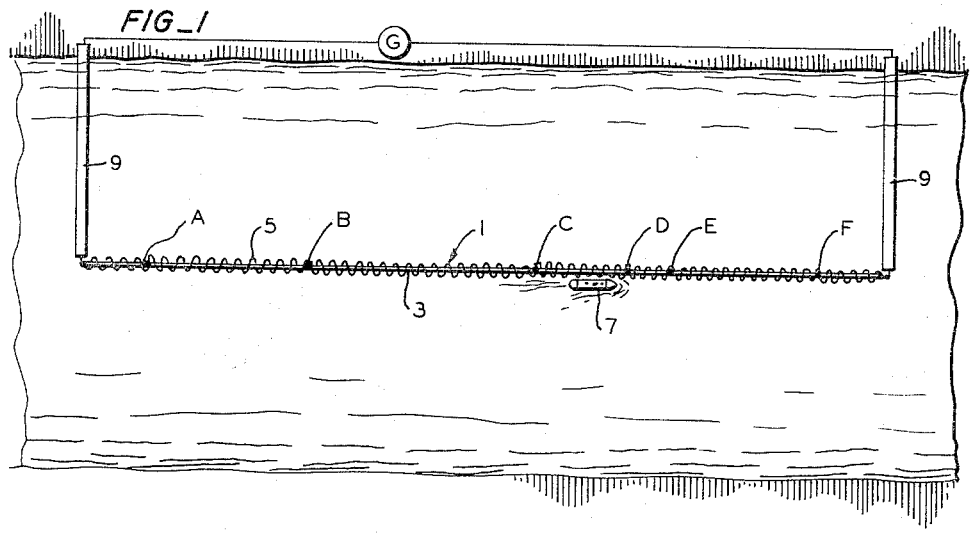
FIG_1
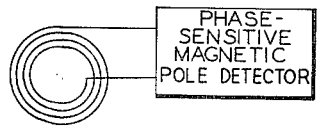
FIG_2
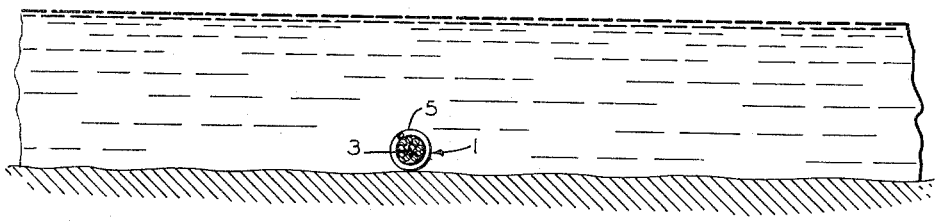
FIG_3
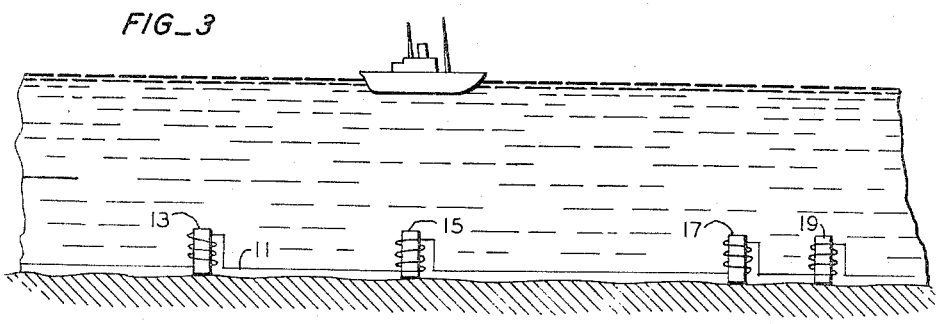
INVENTOR.
WILLIAM H. BUSSEY
BY
Paul M. Klein Jr.
ATTORNEY

United States Patent Office 3,184,708
Patented May 18, 1965

3,184,708
ELECTRICAL GUIDANCE SYSTEM FOR SHIPS
William H. Bussey, Rockford, Ill., assignor, by mesne assignments, to the United States of America as represented by the Secretary of the Navy
Filed May 3, 1960, Ser. No. 26,662
4 Claims. (Cl. 340—4)

This invention relates to an electrical guidance system for ships and the like and more particularly to a guidance system using a submarine piloting or leader cable along the path of which a vessel is supposed to follow.

Prior art systems of this general category are well known, as exemplified by U.S. Patents Nos. 736,432, 1,696,230, 2,406,512, and 2,428,360. The prior art systems have made it possible for it to be determined from a ship when the ship is above the cable. However, it is also desirable to know the ship's position along the cable lengthwise and the known prior art fails to provide this information. A principal object of the invention, therefore, is to provide an apparatus using a piloting cable wherein the ship's position along the cable lengthwise can readily be determined.

Other objects and many of the attendant advantages of this invention will be readily appreciated as the same becomes better understood by reference to the following detailed description when considered in connection with the accompanying drawings wherein:

FIG. 1 is a more or less schematic view of one preferred embodiment of the invention for guiding a ship which is provided with suitable detecting apparatus;

FIG. 2 is a schematic representation of a detector apparatus used on a vessel in relation to a submarine cable, the latter being shown in cross section; and FIG. 3 is a schematic view showing another preferred embodiment of the cable of the present invention used in a pilotage arrangement.

The positioning of a vessel over a submarine cable carrying an electric current is well known in the art, and the present invention contemplates the use of any such convenient method for locating and maintaining a vessel over the cable. To accomplish the purpose of the invention, which is to know the ship's position along the cable lengthwise, a plurality of magnetic poles is provided along the length of the cable uniquely arranged at substantially spaced locations. By detecting the presence of poles at as few as two successive locations, it is possible to immediately locate the ship's position along the cable.

FIG. 1 shows perhaps the simplest arrangement embodying the invention. A cable generally indicated at 1 is laid along the path to be followed by ships. The cable is made of a central ferro-magnetic core 3 around which is wound a winding of conducting wire 5 with the direction of winding being reversed at predetermined intervals such as the points A, B, C, D, E, and F. When, for example, a direct current from generator "G" is passed through the winding, a succession of opposite poles is produced at successive locations. For example, if a north pole is produced at location A, then a south pole would be produced at location B, etc. A ship 7 having any convenient well-known type of magnetic sensing device, such as search coils, in passing over the cable 1 would be able to detect the presence of each of the poles. By making any desirable unique arrangement of these poles, the ship can readily determine its position along the cable. The simplest unique arrangement is merely to have the distance between each successive pair of poles different from that between every other pair. In such a case, if the ship in passing along the cable from point A to point F detects a pole of one polarity and thereafter detects a pole of opposite polarity after having traveled a distance equal to the length C–D, as computed from its known speed, then the vessel can correctly conclude that at the point of detection of the second pole, it was located at the point D. To prevent undesired detection of the cable at points off the proposed path, the cable can be shielded magnetically as by shields 9 in a manner well known in the art.

Instead of using a direct current through the cable, it is also possible to use an alternating current in which case it is preferable to use a phase-sensitive detector connected to the search coils as shown schematically in FIG. 2. Such detectors are well known in the art and will readily detect the presence of a pole.

In FIG. 3 is shown a modification in which the cable is laid as a simple leader or pilot cable 11 and magnetic poles or markers 13, 15, 17, and 19 are located along the cable in the fashion of telephone wires and poles. The magnetic signals for longitudinal position are produced then, not by a superposed cable winding but by these electromagnets staked out along the cable. Power for activating the electromagnets is supplied by the cable. Here, again, the ship determines its position by virtue of the fact that there is a unique distance between each successive pair of electromagnets.

Although the unique spacing between the successive locations of the electromagnets is the simplest arrangement to facilitate longitudinal location of a vessel, other means are equally within the scope of the invention. For example, at each location there might be arranged a unique permutation of a group of poles spaced closely enough together to constitute one location but far enough apart from each other so as to be separately detectable. For example, using four elements, it is apparent that numerous unique permutations can be arranged thus: for example, NNSS, NNNS, NNNN, NSNS, SSNN, SSSN, etc.

Obviously, many modifications and variations of the present invention are possible in the light of the above teachings. It is therefore to be understood that within the scope of the appended claims, the invention may be practiced otherwise than as specifically described.

What is claimed is:

1. A submarine piloting cable having disposed therealong at various substantially spaced locations magnetic poles, the disposition of said poles among said locations being uniquely arranged whereby the longitudinal position of each location along said cable can be determined by sensing the poles at as few as two succeeding locations.

2. An apparatus for ascertaining position relative to a pre-arranged guiding system comprising the cable of claim 1 located along the course to be followed by a vessel, and a phase-sensitive detector for sensing the presence and nature of the poles located along said cable.

3. A submarine piloting cable comprising a ferromagnetic core and a winding of conducting wire superimposed on this core, the direction of the winding being reversed at various intervals along the length of the cable to produce electromagnetic poles at the locations of reversal; and the distance between each successive pair of poles being uniquely different from the distance between every other successive pair of poles.

4. A submarine piloting cable having spaced therealong its length a plurality of electromagnets whose power is supplied by said cable, said electromagnets being so designed and oriented as to produce a magnetic pole capable of being sensed by a vessel passing over the electromagnet; the length of the interval between each successive pair of electromagnets being unique, whereby the location of the electromagnets along the cable can be determined from sensing the presence of two successive electromagnets and knowing the distance between them.

References Cited by the Examiner

UNITED STATES PATENTS

| | | | |
|---|---|---|---|
| 573,823 | 12/96 | Leffler | 104—148 |
| 1,020,942 | 3/12 | Bachelet | 104—148 |
| 1,470,389 | 10/23 | Rellstab | 340—4 |
| 1,696,230 | 12/28 | Gilbert | 340—4 |
| 1,711,879 | 5/29 | Ehret | 340—4 |
| 2,238,072 | 4/41 | Nelson et al. | |
| 2,428,360 | 10/47 | Dingley | 340—4 |
| 2,493,755 | 1/50 | Ferrill. | |
| 2,602,840 | 7/52 | McKee et al. | 317—158 |
| 3,029,893 | 4/62 | Mountjoy | 180—82.1 |

FOREIGN PATENTS

| | | | |
|---|---|---|---|
| 21,610 | 9/12 | Great Britain | 340—4 |
| 146,959 | 2/22 | Great Britain | 340—4 |

CHESTER L. JUSTUS, *Primary Examiner.*

FREDERICK M. STRADER, *Examiner.*